Nov. 4, 1958    F. KESSELRING    2,859,400
ALTERNATING CURRENT SWITCHING DEVICE
Filed March 18, 1953
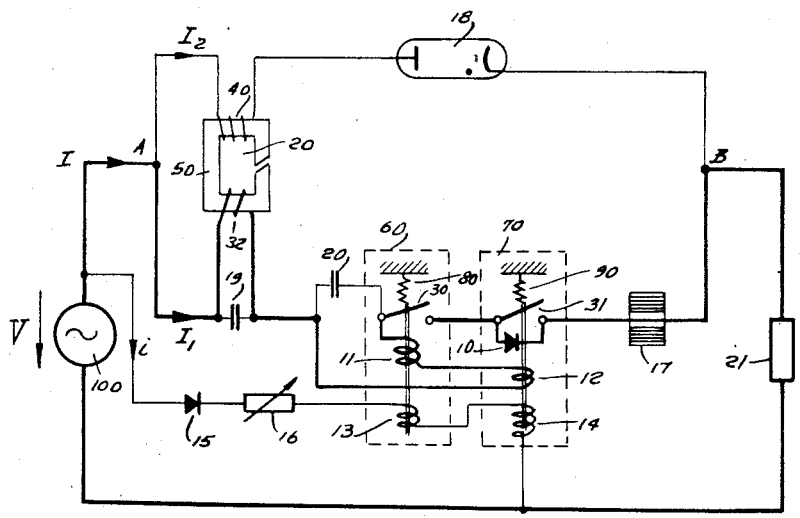
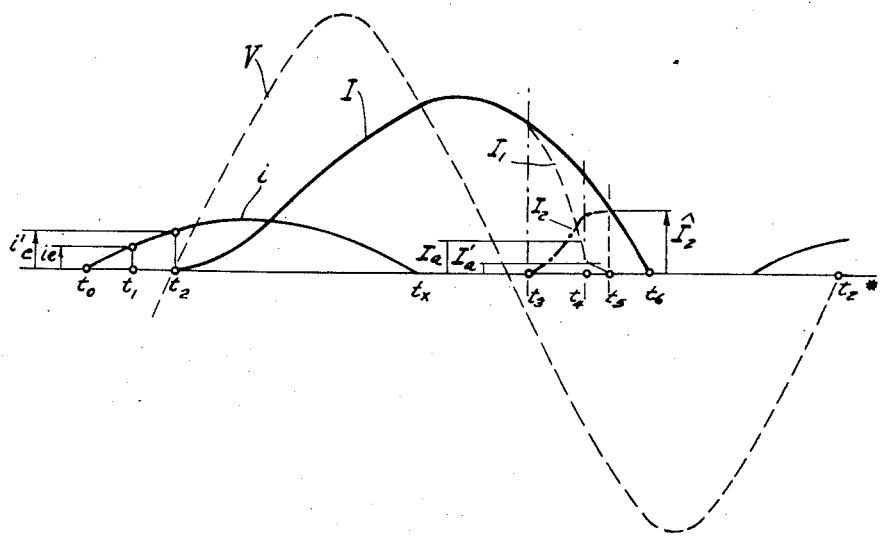
INVENTOR.
FRITZ KESSELRING
BY
Ostrolenk + Faber
ATTORNEYS

United States Patent Office 2,859,400
Patented Nov. 4, 1958

2,859,400

ALTERNATING CURRENT SWITCHING DEVICE

Fritz Kesselring, Zollikon-Zurich, Switzerland, assignor to FKG Fritz Kesselring Geratebau A. G., Bachtobel-Weinfelden, Thurgau, Switzerland, a corporation of Switzerland Application March 18, 1953, Serial No. 343,079

Claims priority, application Switzerland March 22, 1952

1 Claim. (Cl. 321—48)

This invention relates to an improvement for parallel path rectifier units and is more particularly related to a novel means whereby the efficiency of an electromagnetic rectifier disclosed in my copending application Serial No. 343,077 filed March 18, 1953, now Patent No. 2,782,345, can be greatly improved.

As noted in my copending application, the functional electromagnetic rectifier can be constructed by using a novel circuit arrangement of parallel current and voltage paths to thereby eliminate the commutating reactor heretofore considered essential to magnetic rectifying circuits.

The commutating reactor is usually a complex device requiring a core of magnetic material in thin strip form having a steep hysteresis loop characteristic curve.

With the arrangement set forth in the above identified copending application, current is diverted from the current path, which contains an electromagnetic switch, at the time of contact disengagement so that switching can be achieved at current zero conditions. Thus, in effect, the voltage path, by diverting the load current from the electromagnetic switching device replaces the commutating reactor by serving to protect the cooperating contacts during commutation.

In this arrangement, a voltage rectifier is connected in series with the voltage path and a current rectifier connected in series with the current path.

Since current diversion into the voltage path occurs only immediately prior to current zero conditions in the current path, the voltage rectifier is never required to carry full load current.

However, since this circuit is connected in series with the source and load even during the non-conducting half cycle, it is essential that the voltage rectifier be capable of withstanding the full negative reverse voltage.

On the other hand, the current rectifier must be capable of conducting the maximum value of load current even though it need not be designed to withstand the full back voltage during the non-conducting negative half cycle since it is in series with the open switch during this period of time.

Although the magnetic rectifier of the above described type will have an efficiency in excess of 90%, it is an object of this invention to eliminate the IR drop which exists due to the full load current flow through the current rectifier and thereby increase the efficiency of the device.

The current rectifier is provided in the circuit for the sole purpose of preventing back flow of current when the main electromagnetic switch is being moved from the closed to the open position.

That is, during the critical opening period when there is a possibility of arc creation and or ionization of the air surrounding the moving contacts, it is essential to prevent back flow of current.

Following the complete separation of the contacts and interruption of the circuit, the non-ionized air gap will provide sufficient resistance to prevent the flow of back current. Therefore, it is essential to provide the current rectifier in series with the switching device so that it will be operative during this critical switching period.

Heretofore, the current rectifier remained in the electrical circuit during the entire conducting cycle of the alternating current switch device. Thus, although the current rectifier serves no useful function during the portion of the conducting cycle, existing during the increasing positive half cycle and a substantial portion of the decreasing positive half cycle, it nevertheless remained in the circuit and hence, introduced undesirable voltage losses there-across.

Recognizing the fact that the current rectifier need only be inserted in the circuit immediately prior to the open switching operation, I have devised a novel circuit arrangement wherein the current rectifier is switched into the circuit and rendered effective only during the relatively small period of the conducting cycle when it is beneficial to the operation of the device and is switched out of the circuit and rendered ineffective during the major portion of the conducting cycle when it would ordinarily serve no beneficial function to the device.

More specifically, I provide a bridging switch which is connected in parallel with the current rectifier. Thus, by providing circuitry which can control the operation of the bridging switch, it is possible to switch the current rectifier into the circuit or render it effective whenever the bridging switch is opened and in like manner, switch the rectifier out of the circuit or render it ineffective when the bridging switch is closed.

My novel circuitry provides an arrangement whereby this bridging switch is closed to thereby render the current rectifier ineffective immediately prior to the start of the conducting cycle. That is, immediately prior to the closing of the main electromagnetic switch, the bridging switch is closed to thereby effectively remove the current rectifier from the current path.

Thus, when the main electromagnetic switch is closed, the full load current will be diverted around the current rectifier through the substantial short circuit caused by the shunting bridging switch. This condition will prevail throughout a substantial portion of the conducting cycle. Hence, since the current rectifier is effectively removed from the circuitry, there will be no IR drops there-across and hence, the efficiency of the alternating current switch will be considerably increased.

As fully set forth in my above identified copending application, the main electromagnetic switch will be opened when the current of the current path passes through zero. Thus, immediately prior to this current zero condition in the current path, the ampere turns of the holding coil for the bridging switch are sufficiently reduced to enable the opening biasing spring of the movable contact to prevail and allow the bridging switch to open.

Hence, the current rectifier will again be induced into the circuit or rendered effective so that it can prevent back flow of current during the open switching operation of the main electromagnetic switch.

Accordingly, a primary object of my invention is to provide a parallel path electromagnetic rectifier in which the current rectifier is rendered ineffective during a major portion of the conducting cycle.

Still another object of my invention is to provide a parallel path type magnetic rectifier in which the effectiveness of the current rectifier can be precisely controlled so that it can be operatively connected into the circuit only during the relatively small period of time when it is beneficial thereto.

A further object of my invention is to provide an alternating current switch device which has a theoretical maximum efficiency of 99%.

Still another object of my invention is to provide a control means for a current rectifier which has a parallel path magnetic rectifying device which can intermittently induce and remove the current rectifier during its period of maximum utility.

Still another object of my device is to provide a parallel path rectifying unit in which the IR drop of the current rectifier is reduced to a minimum.

Still another object of my invention is to provide a parallel path rectifier in which the maximum current carrying requirement of the current rectifier is substantially reduced.

These and other objects of my invention will be apparent from the following description and figures in which:

Figure 1 is a circuit diagram illustrating a parallel path magnetic rectifier and shows my instant invention of a control circuit for the current rectifier. This figure illustrates the bridging switch for the current rectifier which enables the current rectifier to be effective only during the period of the conducting cycle when it has a beneficial effect on the device.

Figure 2 is a voltage-current versus time diagram illustrating various electrical conditions existing within the electrical circuit.

Referring now to the drawings, an alternating current source 10 provides energy which is to be rectified by the alternating current switch for use by the load 21.

The basic operation of the parallel path alternating current switching device is clearly set forth in my heretofore mentioned copending application and will be briefly outlined here.

The main electromagnetic switch 60, the current rectifier 10 and the primary winding 32 comprise the current path and the gas tube 18 in series with the secondary winding 40 comprise the voltage path.

The main electromagnetic switch 60 is provided with a closing coil 13 and a holding coil 11. The holding coil 13 is energized through the circuit consisting of the diode 15 and the variable resistance 16.

The current flow $i$ will lead the load current I as illustrated in the figures. This may be achieved by the circuitry shown in the above identified application or by any other desirable means well known in the art and forms no part of my present invention.

Thus, at time $t_2$ when the current $i$ reaches the magnitude $i$ $i_e'$, the closing coil 13 will be sufficiently energized to move the cooperating contacts 30 against the force of the biasing spring 80 to the closed position and will permit load current to start to flow from the source 100 to the primary winding 32, the holding coil 11, the bridging contact 30 to the load 21 and back to the source 100.

Immediately prior to the closing of the movable contact 30 there was no current flow through the load since the cooperating contacts 30 of the main electromagnetic switch were open and prevented current flow in the current path and the gas diode 18, being poled in a direction opposite to the negative polarity of the voltage V of the source 100, prevent back flow of current through the voltage path.

However, immediately following the closing of the cooperating contacts 30, load current commences to flow through the holding coil 11, as above noted, to thereby hold the cooperating contacts in high pressure engagement.

Thus, a current $I_1$ will flow through the current path.

It will be noted that the energized primary winding 32, of transformer 20, will induce an E. M. F. in the secondary winding 40 through the magnetic core 50 which is of a polarity opposite to that required to break down the gas diode 18. Hence, during the entire increase in the positive cycle of the load current, there will be no conduction through the voltage branch. Thus, the current $I_1$ flowing in the current branch will be near to the total load current I.

It is only during the decreasing portion of the positive cycle that the induced E. M. F. in the secondary winding 40 is of proper polarity to permit the firing of the gas diode 18. Hence, as seen in Figure 2, the current $I_2$ will commence to flow through the voltage path at the time $t_3$.

Since the inductance of the voltage path is in excess of that in the current path, the current $I_2$ will lag the current $I_1$. Thus, when the current $I_1$ goes through current zero, at time $t_5$, the main electromagnetic switch 60 can have its cooperating contacts 30 open under currentless conditions even though a current $I_2$, now equal to the total of load I passes through zero, there will be no back flow of current due to the negative poling of the gas diode 18.

It will be noted that during the open switching operation of the cooperating contacts 30, it is essential to have the current rectifier 10 to prevent any back flow of current during this critical period of time.

However, from the time $t_2$ until the time immediately preceding time $t_5$ (about time $t_4$), the current rectifier 10 serves no useful function and in fact is actually detrimental to the circuit since it introduces undesirable voltage drops.

By the invention of the instant application, I provide a bridging switch 70 which can switch out or render the current rectifier 10 ineffective during the period from $t_2$ to $t_4$ when it would ordinarily serve no useful function to the device.

The operation of the bridging switch 70 is as follows:

The closing coil 14 is connected in series with the closing circuit comprising the rectifier 15, the variable resistor 16 and the holding coil 13 of the main magnetic switch 60. Thus, the closing coil 14 will be energized by the current $i$ in the same manner as before described in connection with the closing coil 13.

However, the closing coil 13 of the bridging switch 70 is constructed with considerably more turns than the closing coil 13 of the main magnetic switch 60 so that a small magnitude of current $i$ will sufficiently energize the switch to move the operating contacts 31 to the engaged position against the bias of the opening spring 90.

The bridging switch 70 is so designed that a magnitude of closing current equal to $i_e$ existing at time $t_1$ will be sufficient to close the cooperating contact 31 of the bridging switch 70 even though the main magnetic switch 60 is not closed.

Thus, it will be noted that immediately prior to the conducting half cycle, the current rectifier 10 is rendered ineffective by providing a substantially short circuit thereacross due to the engagement of the cooperating contacts 31.

The closing coil 13 of the main magnetic switch 60 is designed with a predetermined number of turns so that the ampere turns created by the closing current having a magnitude $i_e'$ will be sufficient to close the cooperating contacts 30 of the switch 60. It will be noted in Figure 2 that this condition exists at time $t_2$. That is, the main electromagnetic switch 60 will close when the voltage V of the source 100 passes through zero in a positive direction.

It will be noted that since the closing current $i$ will decrease to zero at time $t_x$, that the cooperating contacts 30 and 31 will be held closed against their respective open biasing springs 80 and 90 due to the energization of the series connected holding coils 11 and 12 by the load current $I_1$.

The switches 60 and 70 are so constructed that the holding coil 12 has less turns than the holding coil 11. Hence, when the load current reaches a particular predetermined value, the ampere turns of the holding coil 12 for the bridging switch 70 will be insufficient to maintain the cooperating contacts 31 closed against the opening force of the biasing spring 90 whereas the same current will result in a sufficient member of ampere turns eminating from the holding coil 11 of the main magnetic switch 60 will prevail to maintain the cooperating contacts 30 closed despite the opening spring 80.

Thus, as seen in Figure 2, any current below the value $I_a$ will result in insufficient energization of the holding coil 12 to maintain the bridging switch in closed position although this magnitude of current is sufficient to maintain the main electromagnetic switch 60 closed.

Thus, it will be noted that at about the time $t_4$, which is immediately prior to the time when the main electromagnetic switch is to open ($t_5$), the bridging contacts 31 will be open to thereby re-introduce the current rectifier 10 in the circuit. That is, the current rectifier 10 will be rendered effective by means of the bridging switch 70 immediately prior to the current zero condition in the current path. It is at the current zero condition, as heretofore described, that the main electromagnetic switch will open and since it is only during this relatively short interval of time that the current rectifier will be required to function in the circuit, it can be seen that my novel device re-introduces or renders the current rectifier effective only during the small period of the conducting cycle when it is needed.

It will be noted that since the current rectifier 10 is not required to carry the full load current I or $I_1$, that it may be a relatively small unit having relatively little reactance. Accordingly, even though the bridging switch 31 is opened at about time $t_4$, when a current $I_a$ or $I_a'$ is flowing through the cooperating contacts 31, no sparking or pitting will occur due to the shunting path available through the current rectifier 10.

Since the reactance of this unit can be kept to substantially zero, there will be no back E. M. F. created therein during this commutation period.

It will be noted that the circuit may be provided with a small saturable reactor 10 in order to provide a step for the switching operation of the main electromagnetic switch 60. The saturable reactor 17 may be pre-excited (not shown) and functions in the manner old and well known in the art.

Furthermore, the circuitry may be provided with a condenser 19 as a bypass for the primary winding 32 and the condenser 20 as a bypass for the holding coils 11 and 12 to compensate or eliminate undesirable trunnion effects during the multiplicity of said operations.

It will be noted that the preferred embodiment of my invention is illustrated in the circuit diagrams of the figures wherein a gas diode 18 is illustrated as the voltage rectifier for the current rectifier.

However, as clearly set forth in the above identified copending application, it will be apparent to those skilled in the art that the voltage rectifier 18 illustrated as a gas diode may be replaced by other types of units having similar characteristics such as a germanium rectifier, a cesium vapor rectifier.

Accordingly, I have provided a novel improvement for parallel path rectifiers wherein the current rectifier can be switched into and out of circuit depending on whether or not it is useful during a particular portion of the conducting cycle by insuring that the current rectifier is only inserted or rendered effective immediately prior to the current zero conditions in the current path.

The voltage losses can be considerably reduced, the continuous current rate of the requirements of the current rectifier can be reduced, the coiling problems associated with the rectifier can be reduced and the efficiency of the alternating current switch can be increased to over 99%.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claim.

I claim:

An electromagnetic rectifier circuit comprising an A.-C. source, a D.-C. load, an electromagnetic switch having an operating winding and pair of cooperable contacts movable into and out of engagement with respect to one another, an energizing circuit for said operating winding, and a first diode having a relatively low inverse voltage rating and a relatively high forward current rating; said A.-C. source, electromagnetic switch cooperable contacts, first diode, and D.-C. load forming a closed main load circuit; said energizing circuit being connected to said electromagnetic switch operating winding to operate said pair of contacts to their engaged position at a predetermined time; a voltage path including a second diode and a reactor; said reactor inductively coupling said voltage path and said main circuit to induce load current flow from said main load circuit to said voltage path prior to the operation of said cooperable contacts to their disengaged position; and an auxiliary electromagnetic switch; said auxiliary electromagnetic switch comprising a pair of cooperable auxiliary contacts and an operating winding; said pair of cooperable auxiliary contacts being connected across said first diode; and energizing means for said operating winding of said auxiliary electromagnetic switch to close said auxiliary contacts and short circuit said first diode for a substantial portion of its forward conducting cycle and substantially eliminate the forward voltage drop on said first diode.

References Cited in the file of this patent

UNITED STATES PATENTS

| 2,610,231 | Wettstein | Sept. 9, 1952 |

FOREIGN PATENTS

| 511,702 | Great Britain | Aug. 23, 1939 |
| 875,695 | France | June 29, 1942 |
| 729,622 | Germany | Dec. 19, 1942 |